US011988101B2

(12) United States Patent
Cribley et al.

(10) Patent No.: US 11,988,101 B2
(45) Date of Patent: May 21, 2024

(54) DEVICE FOR FIXING POSITION OF ADJUSTABLE ROWS OF GUIDE VANES OF TURBOMACHINE

(71) Applicant: General Electric Company, Schenectady, NY (US)

(72) Inventors: Laurie Ann Cribley, Holt, MI (US); Rubi Elizabeth Triana Zorsano, Nuevo Leon (MX)

(73) Assignee: GE Infrastructure Technology LLC, Greenville, SC (US)

(*) Notice: Subject to any disclaimer, the term of this patent is extended or adjusted under 35 U.S.C. 154(b) by 0 days.

(21) Appl. No.: 18/155,934

(22) Filed: Jan. 18, 2023

(65) Prior Publication Data

US 2023/0287799 A1 Sep. 14, 2023

Related U.S. Application Data

(60) Provisional application No. 63/318,496, filed on Mar. 10, 2022.

(51) Int. Cl.
*F01D 17/16* (2006.01)

(52) U.S. Cl.
CPC ........ *F01D 17/162* (2013.01); *F05D 2220/30* (2013.01); *F05D 2240/12* (2013.01); *F05D 2260/60* (2013.01)

(58) Field of Classification Search
CPC ............... F01D 17/162; F05D 2220/30; F05D 2240/12; F05D 2260/60
See application file for complete search history.

(56) References Cited

U.S. PATENT DOCUMENTS

| | | | |
|---|---|---|---|
| 10,590,632 B2 | 3/2020 | Parzynski et al. |
| 10,669,882 B2 | 6/2020 | Nakayama et al. |
| 11,015,477 B2 | 5/2021 | Lagarde et al. |
| 11,156,120 B2 | 10/2021 | Osborne et al. |
| 2015/0337685 A1 | 11/2015 | Golubic et al. |
| 2017/0191381 A1 | 7/2017 | Baba et al. |
| 2017/0204745 A1 | 7/2017 | Lochner et al. |
| 2017/0268375 A1 | 9/2017 | Osborne et al. |

(Continued)

FOREIGN PATENT DOCUMENTS

WO 2014/189568 A2 11/2014

OTHER PUBLICATIONS

Non Final Office Action mailed Sep. 14, 2023 for U.S. Appl. No. 18/155,942, filed Jan. 18, 2023; pp. 21.

(Continued)

*Primary Examiner* — Grant Moubry
*Assistant Examiner* — Ruben Picon-Feliciano
(74) *Attorney, Agent, or Firm* — James Pemrick; Charlotte Wilson; Hoffman Warnick LLC

(57) ABSTRACT

A device for fixing the position of adjustable vane rows of a turbomachine is disclosed. The device is intended for use with a turbomachine in which the guide vanes of a row of adjustable guide vanes are coupled together by a synchronizing ring. The device includes a support arm and at least one ring fixing set including a holding member and a fixing bolt. The fixing bolt is provided and dimensioned to engage an opening at the circumference of the synchronizing ring and to fix the position of the synchronizing ring and thus of the adjustable guide vanes coupled to the synchronizing ring.

7 Claims, 3 Drawing Sheets

(56) References Cited

U.S. PATENT DOCUMENTS

| | | | |
|---|---|---|---|
| 2017/0321563 A1 | 11/2017 | LeBlanc et al. | |
| 2018/0283214 A1 | 10/2018 | Kolvick et al. | |
| 2019/0063245 A1 | 2/2019 | Wojciechowski et al. | |
| 2019/0101012 A1 | 4/2019 | Kolvick et al. | |
| 2019/0383163 A1 | 12/2019 | Hernandez et al. | |
| 2020/0109640 A1 | 4/2020 | Dohse et al. | |
| 2021/0025286 A1* | 1/2021 | Fassett | F01D 9/04 |
| 2021/0140331 A1 | 5/2021 | Little | |

OTHER PUBLICATIONS

U.S. Appl. No. 18/155,942, Notice of Allowance and Fee(s) Due dated Jan. 10, 2024, 11 pages.

* cited by examiner

DEVICE FOR FIXING POSITION OF ADJUSTABLE ROWS OF GUIDE VANES OF TURBOMACHINE

This application claims priority to U.S. Provisional Patent Application No. 63/318,496, filed Mar. 10, 2022.

TECHNICAL FIELD

The present disclosure relates to a device for fixing the position of adjustable guide vane rows of a turbomachine.

BACKGROUND

When working on open turbomachines, the need may arise to fix the position of rows of variable guide vanes. In numerous applications, the adjustable guide vanes of a row of adjustable guide vanes are connected to each other by a synchronizing ring, which ensures synchronous movement of all guide vanes of a row of adjustable guide vanes. The adjustment of the adjustable guide vanes can then be affected very simply, for example, by rotating the synchronizing ring about the axis of the turbomachine. WO 2014/189568 describes a turbomachine with several rows of adjustable guide vanes, each of the rows of adjustable guide vanes being adjusted by means of two synchronizing rings. US 2019/0383163 describes an adjusting mechanism for rows of adjustable guide vanes, wherein the synchronizing rings are self-centering. US 2018/0058246 describes a variable vane mechanism for adjusting the angle of guide vanes in a gas turbine engine. The mechanism comprises a circumferentially extending synchronizing ring driven circumferentially around a casing by an actuator. The synchronizing ring is connected to the guide vanes by levers so that the pitch angle of the vanes changes relative to the axial flow direction of the turbomachine when the synchronizing ring is rotated in the circumferential direction. The synchronizing ring and the housing are each provided with at least one alignment hole to adjust the initial angle of the blades. At least one of the synchronizing ring and the housing are each provided with at least two alignment holes, so that the initial angle of the blades can be adjusted by selecting different combinations of alignment holes. US2019/316483 proposes a variable vane stabilizer. One or more variable vane stabilizers can be connected between two or more blades of a gas turbine engine to fix the angle of attack of the blades.

BRIEF DESCRIPTION

The subject of the present disclosure is a device of the type mentioned above.

According to one aspect, the device is intended to be simple and flexible to use and is intended to be robust to withstand field conditions of use.

Other effects and advantages of the articles described herein, whether explicitly stated or not, arise in light of the present disclosure.

A device is proposed for fixing the position of adjustable guide vane rows of a turbomachine. Certain dimensions of the device are sized to be suitable for use with a specific type of turbomachine. Of course, the case may also arise where a device is suitable for use with multiple turbomachine types. However, in any case, certain dimensions of the device will result from corresponding dimensions of the turbomachine type or types for use with which the device is intended. The guide vanes of a row of variable guide vanes are coupled together by a synchronizing ring. The synchronizing ring has radial recesses and/or through-holes. The device is provided to secure the circumferential position of the synchronizing ring and thus the position of the guide vanes of the row of adjustable guide vanes. For this purpose, the device comprises a support arm as well as a ring fixing set including a holding member and a fixing bolt. The support arm can be attached to and/or fixed relative to the turbomachine. The at least one holding member is connected to and fixable to the support arm, and the fixing bolt is connected to and fixable to the holding member such that it is variably fixable to the holding member along both a longitudinal direction of the holding member and the longitudinal axis of the fixing bolt itself. A cross-sectional dimension and shape of the fixing bolt are configured at one end of the fixing bolt such that the fixing bolt can be inserted into a radial recess and/or through-opening of the synchronizing ring in order to fix the circumferential position of the synchronizing ring.

"One" or "one" are to be understood in the context of the present disclosure as indefinite articles and not as a number word, unless another meaning is explicitly indicated, for example by the use of "exactly one" or "exactly one."

According to further aspects of the presently described article, it may be provided that the holding member is connected to the support arm and can be fixed thereto in such a way that an angle which a longitudinal extent of the holding member is set with a longitudinal extent of the support arm can be variably adjusted. This can be realized, for example, by fixing the holding member to the support arm by threaded fasteners, e.g., a screw with a nut.

In illustrative embodiments, the position of the longitudinal axis of the holding member can be arranged variably transversely to the longitudinal extent of the support arm within an adjustment range, the adjustment range corresponding at least to the adjustment range in the circumferential direction of an opening in the synchronizing ring whose position the fixing bolt is provided to secure. This makes it possible to fix the position of the adjustable guide vanes in any desired setting.

In illustrative embodiments, it may be provided that the holding member is an elongated plate with an elongated hole, wherein the elongated hole extends in particular along the longitudinal extent of the elongated plate, and wherein the fixing bolt extends through the elongated hole. In this way, in particular the distance of the fixing bolt from the support arm can be variably adjusted. It may further be provided that the fixing bolt has an external threaded portion along at least part of its longitudinal extent, which extends through the elongated hole, wherein a threaded fastener, e.g., nut, is screwed onto the external thread on each side of the elongated plate. By countering the two threaded fasteners (nuts) with the holding member clamped therebetween, the fixing bolt can thus be fixed to the holding member, whereby, on the one hand, the position of the fixing bolt in the elongated hole can be variably adjusted, and, on the other hand, the length by which the fixing bolt protrudes from the holding member on one side can be varied by changing the position of the threaded fasteners (nuts) on the thread.

In the event that the turbomachine includes two or more synchronizing rings for rows of variable guide vanes, it may be provided that the device includes a ring fixing set including a holding member for each of the synchronizing rings and a fixing bolt connected to the holding member and intended for securing the position of a synchronizing ring. It may further be provided that the holding members are arranged at different longitudinal positions along the longitudinal extent of the support arm and are connected to the support arm, and further that the distance of the longitudinal positions from each other corresponds at least approximately to the distance of the synchronizing rings along the axis of the turbomachine.

In illustrative embodiments, the support arm may further include a fastener to fasten the support arm to a fastening location of the turbomachine, i.e., to fix the support arm relative to the turbomachine. A distance between the fastener of the support arm and a location on the support arm where a holding member is connected to the support arm is at least substantially equal to the distance between the fastener location of the turbomachine and a synchronizing ring, along the axis of the turbomachine.

Further disclosed is an arrangement for servicing a turbomachine, comprising the turbomachine and a device according to one of the types described above. The support arm is attached to the turbomachine and extends at least substantially parallel to an axis of the turbomachine. At least one fixing bolt engages at least one radial recess and/or through hole of each synchronizing ring coupling variable guide vanes of the turbomachine, each of said fixing bolts being fixed to a retaining member, which retaining member is in turn fixed to the support arm.

The above specific embodiments may be combined with each other. Further, not specifically disclosed embodiments of the teachings of this document are readily apparent to the person skilled in the art.

BRIEF DESCRIPTION OF THE DRAWINGS

The facts set out here are explained in more detail below with reference to selected examples of embodiments shown in the drawing. In detail.

The drawings are highly schematized. Details not necessary for understanding the objects described have been omitted. Further, the drawings show only selected embodiments and should not be relied upon to limit the objects described in the claims. Embodiments not shown may well be covered by the claims.

DETAILED DESCRIPTION

Figure 1:
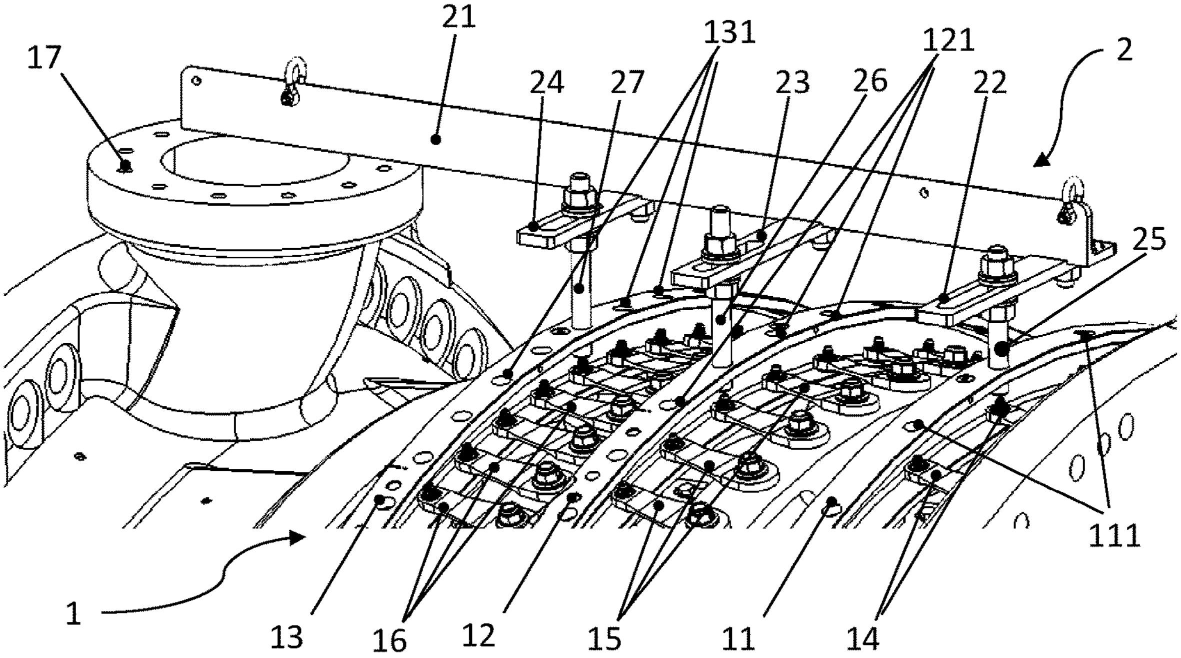
FIG. 1 illustrates a partial view of a turbomachine with three rows of adjustable guide vanes, which are fixed by a device of the type described herein.
Figure 2:
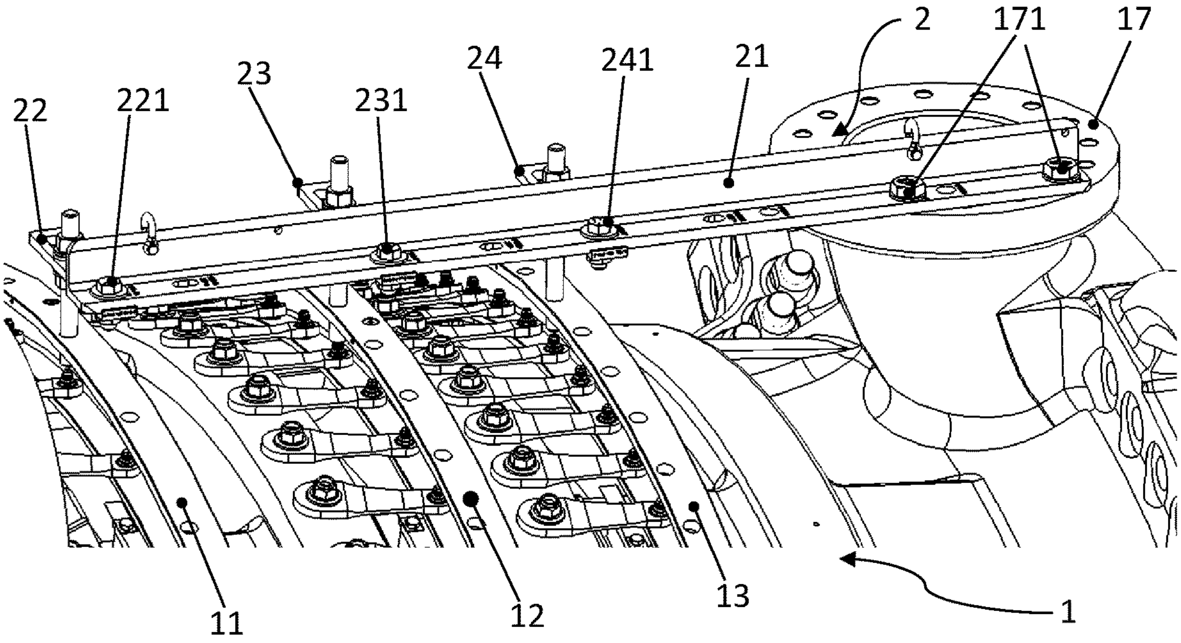
FIG. 2 illustrates a partial view of the turbomachine with the fixing device from FIG. 1 in a different perspective.

FIGS. 1 and 2 show an illustrative turbomachine 1 with three rows of adjustable guide vanes. The turbomachine may be, for example, a compressor, a turbine, or another system having adjustable guide vanes. The adjustable guide vanes, which are not visible in the illustration, are rotatably mounted in the housing of the turbomachine. As an adjusting mechanism for the adjustable guide vanes, one synchronizing ring 11, 12 or 13 is arranged for each row of adjustable guide vanes. Each synchronizing ring is coupled via a number of levers 14, 15 or 16 with the blades of a row of adjustable guide vanes. Thereby, each of levers 14, 15 and 16 protrudes from the axis of rotation of an adjustable guide vane and is coupled to the respective synchronizing ring 11, 12 and 13, respectively. In this way, a rotational movement of one of the synchronizing rings about the axis of the turbomachine is transmitted to a rotation of the guide vanes coupled to the synchronizing ring about the guide vanes, which are rotatably mounted at least essentially radially with respect to the axis of the turbomachine.

During maintenance or repair work on the turbomachine or a turbomachine or other system to which the turbomachine belongs, it may be necessary to fix the position of the guide vanes in a defined manner. This is accomplished in the present case by a fixing device 2. Fixing device 2 comprises a support arm 21 and, in the FIG. 1 embodiment, three ring fixing sets, each ring fixing set including a fixing bolt 25, 26 and 27 which, on the one hand, engage in an opening (e.g., a radial recesses and/or through-openings) 111, 121 and 131, of synchronizing rings 11, 12 and 13 and, on the other hand, are connected to a support arm 21 or fixed relative to the support arm 21 via a holding member 22, 23 and 24 (also referred to as a retaining element). Fixing bolts 25, 26 and 27 are correspondingly designed at least at their distal (second) end. Each distal end is provided to establish the positive connection with synchronizing rings 11, 12 and 13, with a cross-sectional dimension and shape so the fixing bolt can be inserted into an opening 111, 121, 131 (e.g., radial recess and/or through-opening) of the respective synchronizing ring 11, 12, 13. Fixing bolts 25, 26 and 27 include a first end configured to couple to holding members 22, 23 and 24 such that fixing bolts 25, 26 and 27 are adjustable relative to the holding member along both a longitudinal extent of the holding member and a longitudinal extent of the fixing bolt. Fixing bolts 25, 26, and 27 also include a second end configured to couple to opening 111, 121, 131 of the synchronizing ring in order to fix a circumferential position of the synchronizing ring and the position of the guide vanes of the variable guide vane row to which the synchronizing is coupled.

For its part, support arm 21 has suitable means for fastening to turbomachine 1 or relative to turbomachine 1. Support arm 21 may be cantilevered from a housing 17 of turbomachine 1 to provide support for ring fixing sets over synchronizing rings 11, 12, 13. Support arm 21 may alternatively be described as an extension arm, a cantilevered arm, or a boom arm. In the present embodiment, simple holes are provided through which support arm 21 can be fastened to housing (flange) 17 of turbomachine 1 by fastener(s) 171 such as screws or threaded bolts/nuts, as can be seen in FIG. 2. In other embodiments, fastener(s) 171 may also include a support, intermediate elements and the like. Because of the fixing of fixing bolts 25, 26 and 27 relative to support arm 21 and the fixing of support arm 21 relative to turbomachine 1, the respective positions of fixing bolts 25, 26 and 27 are also fixed relative to turbomachine 1.

As fixing bolts 25, 26 and 27 engage in the openings 111, 121 and 131 (e.g., recesses and/or through-holes) of synchronizing rings 11, 12 and 13, their circumferential position relative to housing 17 of turbomachine 1 is also locked, apart from a possible play of the fixing bolts in openings 111, 121 and 131 (radial recesses and/or through-holes), and thus the position of the adjustable guide vanes coupled to synchronizing rings 11, 12 and 13 is fixed. Accordingly, the cross-sectional dimension and shape of fixing bolts 25, 26 and 27, at least at their distal (second) end which is provided to engage in openings 111, 121 and 131 of the synchronizing rings, may be such that the play of the fixing bolts within the openings is minimized. In illustrative embodiments, it may be provided that the fixing bolts 25, 26 and 27 taper in their distal (second) end, thereby facilitating centering of the fixing bolts within the openings. Likewise, it could be provided that fixing bolts 25, 26 and 27 have, at their distal (second) end, an external thread complementary to an internal thread, if any, in openings 111, 121 and 131 of the respective synchronizing ring of turbomachine 1 with which fixing device 2 is provided for use.

Returning to FIG. 2, holding members 22, 23 and 24 are attachable to support arm 21 by means of individual threaded fasteners (bolt and nuts fittings) 221, 231 and 241, respectively. Due to this arrangement, a relative orientation of the longitudinal extent of holding members 22, 23 and 24, designed as elongated plates relative to the longitudinal extent of the support arm, can be variably designed and fixed by tightening the respective threaded fasteners. More particularly, holding members 22, 23 and 24 may include an elongated plate having an elongated hole extending along a longitudinal extent of the elongated plate. Each fixing bolt 25, 26 and 27 extends through a respective elongated hole. More particularly, fixing bolts 25, 26 and 27 are guided in the elongated holes in holding members 22, 23 and 24. In this way, the distance of fixing bolts 25, 26 and 27 from support arm 21 can be varied.

Figure 3:
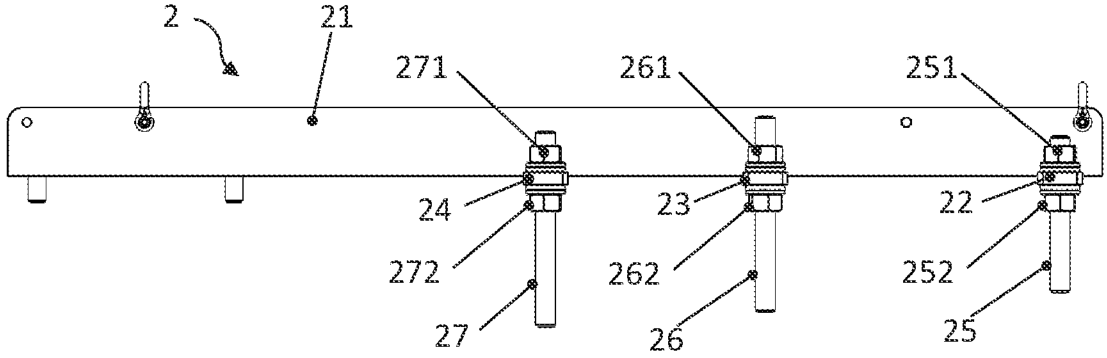
FIG. 3 illustrates a device of the type described here, which is intended for use with a turbomachine with three independent synchronizing rings.

The position of fixing bolt 25, 26 and 27 can be fixed in the illustrated embodiment by tightening a pair of threaded fasteners (nuts), as shown in FIG. 3. Fixing bolt 25, 26 and 27 has, along at least part of a longitudinal extent thereof, an external threaded portion extending through the elongated hole. That is, each fixing bolt 25, 26 and 27 in the illustrated example is threaded along at least part of its length, i.e., it includes at least one externally threaded region. In other examples, an entire fixing bolt 25, 26 and 27 may be a threaded bolt. Each of fixing bolts 25, 26 and 27 extends through an elongated hole in the respective holding member 22, 23 and 24, respectively, and in turn a pair of threaded fasteners (nuts) 251 and 252, 261 and 262 and 271 and 272, respectively, is screwed onto each of the fixing bolts in such a way that the fasteners are arranged on different sides of holding member 22, 23 and 24. That is, a threaded fastener threadedly fastens onto the external threaded portion on each side of the elongated plate of holding members 22, 23 and 24. By countering the fasteners of a pair of fasteners, holding member 22, 23 and 24 can thus be clamped between the fasteners and thus the fixing bolt can be fixed to the holding member. By adjusting the position of the fasteners of a pair of fasteners together, the distance of the second end of a fixing bolt 25, 26 and 27 from a respective holding member 22, 23 and 24 can be changed.

Similarly, again with reference to FIG. 2, fasteners 221, 231 and 241 by which holding members 22, 23 and 24 are retained on and fixable to support arm 21 could also, or alternatively, pass through an elongate hole in the respective holding member and/or support arm. In other, non-limiting embodiments, an elongated hole is arranged in a holding member 22, 23 and 24, through which the fastener 221, 231 or 241 and a fixing bolt 25, 26 or 27 extend together. By the totality of the described features, the position of the distal (second) end of a fixing bolt 25, 26, 27 can be adjusted in three dimensions. In particular, it is provided that the position of the longitudinal axis of a fixing bolt 25, 26 or 27 can be variably arranged transversely to the longitudinal extent of support arm 21 within an adjustment range which corresponds at least to the adjustment range of that synchronizing ring in the circumferential direction of the synchronizing ring. More particularly, holding members 22, 23, 24 of the ring fixing sets are arranged at different longitudinal positions along a longitudinal extent of support arm 21 corresponding to locations of the respective synchronizing rings 11, 12, 13 along an axis of the turbomachine.

Figure 4:
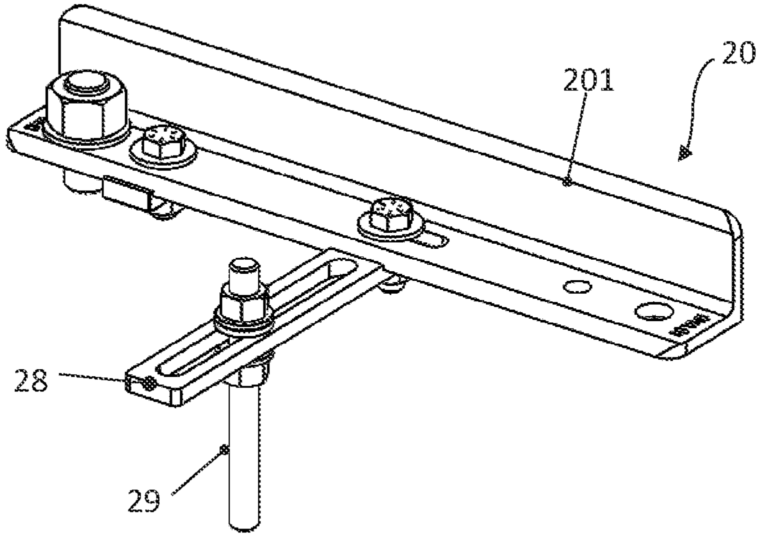
FIG. 4 illustrates a device of the type described herein, which is intended for use with a turbomachine having a single synchronizing ring.
Figure 5:
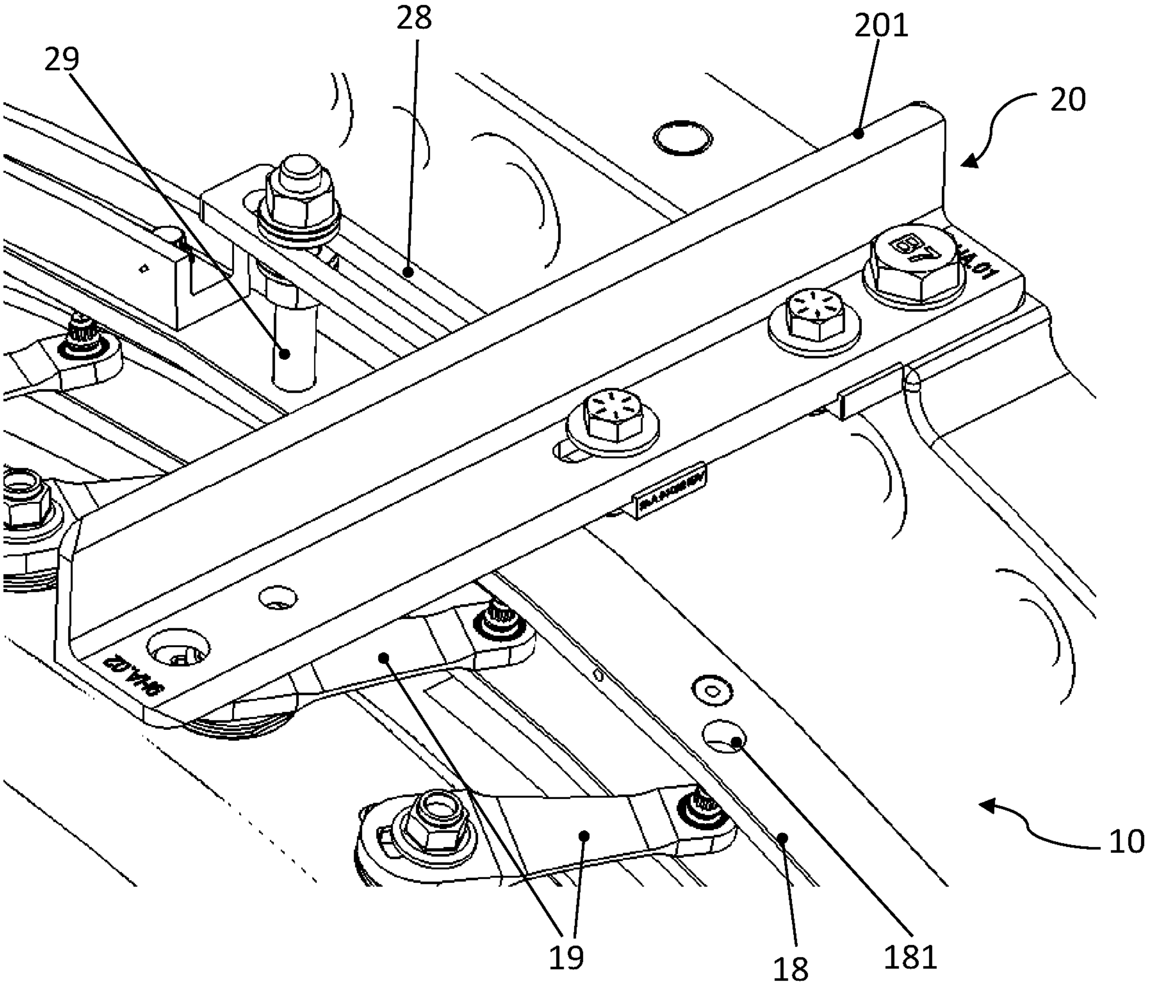
FIG. 5 illustrates a partial view of a turbomachine with a single row of adjustable guide vanes and a synchronizing ring, which are fixed by a device of the type shown in FIG. 4.

FIG. 4 shows a fixing device 20 of the proposed type intended for use with a turbomachine having a single row of adjustable guide vanes, i.e., with a single ring fixing set. Holding member 28 with fixing bolt 29 is arranged on support arm 201. FIG. 5 shows fixing device 20 in connection with a turbomachine 10. Support arm 201 is suitably fixed to the housing of turbomachine 10 or fixed relative thereto. A synchronizing ring 18 of turbomachine 10 is coupled to the guide vanes of a row of adjustable guide vanes via levers 19, analogous to the embodiment example of FIGS. 1 and 2, and serves to synchronously adjust the pitch angle of the adjustable guide vanes. Synchronizing ring 18 has openings 181, e.g., radial recesses or through-holes. Fixing bolt 29 of fixing device 20 engages in one of openings 181 of synchronizing ring 18 and thus secures the position of synchronizing ring 18 and thus the pitch angle of the adjustable guide vanes, which are coupled to synchronizing ring 18 via levers 19.

As shown in FIG. 1, the fixing devices described here can be provided with any number of ring fixing sets each including holding members and fixing bolts for use with turbomachines with different numbers of rows of adjustable guide vanes or synchronizing rings. That is, where turbomachine includes two or more rows of variable guide vanes with each row having a respective synchronizing ring coupling together guide vanes of the respective variable guide vane row, the device further comprises a ring fixing set, as described herein, coupled to the support arm for fixing the position of each of the two or more variable guide vane rows.

Although the subject matter of the present disclosure has been explained with reference to selected examples of embodiments, these are not intended to serve as a limitation of the claimed invention. The claims include embodiments that are not explicitly shown, and embodiments that differ from the examples shown are nevertheless covered by the claims.

The invention claimed is:

1. A device for fixing a position of at least one variable guide vane row of a turbomachine, guide vanes of each variable guide vane row being coupled together by a synchronizing ring having at least one opening therein, the device comprising:

a support arm fixed relative to the turbomachine;

a plurality of ring fixing sets coupled to the support arm for fixing the position of the at least one variable guide vane row, each ring fixing set including:

a holding member coupled to the support arm and including an elongated plate having an elongated hole extending along a longitudinal extent of the elongated plate; and a fixing bolt extending through the elongated hole and including:

a first end configured to couple to the holding member such that the fixing bolt is adjustable relative to the holding member along both a longitudinal extent of the holding member and a longitudinal extent of the fixing bolt, and a second end configured to couple to the at least one opening of the synchronizing ring in order to fix a circumferential position of the synchronizing ring and the position of the guide vanes of the variable guide vane row to which the synchronizing is coupled.

2. The device according to claim 1, wherein an axial position of the holding member is variably adjustable transversely to a longitudinal extent of the support arm within an adjustment range.

3. The device according to claim 1, wherein the holding member and the elongated hole each extend transversely to the support arm, the elongated hole having a length and the fixing bolt have a width less than the length of the elongated hole, and wherein a circumferential position of the fixing bolt is variably adjustable to a longitudinal extent of the holding member within an adjustment range, the adjustment range being of substantially equal length as the elongated hole.

4. The device according to claim 1, wherein the fixing bolt has, along at least part of a longitudinal extent thereof, an external threaded portion extending through the elongated hole, and further comprising a threaded fastener threadedly fastened onto the external threaded portion on each side of the elongated plate.

5. The device according to claim 1, wherein the turbomachine includes two or more rows of variable guide vanes with each row having a respective synchronizing ring coupling together guide vanes of the respective variable guide vane row, and the device further comprises at least one of the plurality of ring fixing sets coupled to the support arm for fixing the position of each of the two or more variable guide vane rows.

6. The device according to claim 5, wherein the holding members of the ring fixing sets are arranged at different longitudinal positions along a longitudinal extent of the support arm corresponding to locations of the respective synchronizing rings along an axis of the turbomachine.

7. The device according to claim 1, further comprising a fastener for fastening the support arm relative to a fastening location of the turbomachine, wherein a distance between the fastener and a location on the support arm where the holding member is connected to the support arm corresponds to a distance between the fastening location of the turbomachine and the synchronizing ring, along an axis of the turbomachine.

* * * * *